(12) United States Patent
Allias et al.

(10) Patent No.: US 12,291,339 B2
(45) Date of Patent: May 6, 2025

(54) ELECTRICAL PROPULSION SYSTEM INCLUDING A PLURALITY OF ELECTRIC MOTORS COUPLED TO THE SAME INPUT SHAFT OF A TRANSMISSION SYSTEM, AIRCRAFT INCLUDING AT LEAST ONE SUCH ELECTRICAL PROPULSION ASSEMBLY

(71) Applicants: Airbus SAS, Blagnac (FR); Airbus Operations SAS, Blagnac (FR)

(72) Inventors: Jean-François Allias, Toulouse (FR); Damien Mariotto, Marignane (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 18/417,339

(22) Filed: Jan. 19, 2024

(65) Prior Publication Data
US 2024/0253798 A1 Aug. 1, 2024

(30) Foreign Application Priority Data
Jan. 30, 2023 (FR) ...................................... 2300838

(51) Int. Cl.
*B64D 27/35* (2024.01)
*B64D 35/021* (2024.01)
(Continued)

(52) U.S. Cl.
CPC ........... *B64D 27/35* (2024.01); *B64D 35/021* (2024.01); *B64D 35/08* (2013.01); *F01D 15/02* (2013.01);
(Continued)

(58) Field of Classification Search
CPC .... B64D 27/35; B64D 27/351; B64D 27/353; B64D 27/355; B64D 27/357; B64D 35/00;
(Continued)

(56) References Cited

U.S. PATENT DOCUMENTS

| | | | | |
|---|---|---|---|---|
| 2,401,694 A | * | 6/1946 | Lundquist | B64D 35/04 475/159 |
| 2,457,999 A | * | 1/1949 | Hulbert | F16N 7/36 416/129 |

(Continued)

FOREIGN PATENT DOCUMENTS

| | | |
|---|---|---|
| EP | 3875375 A1 | 9/2021 |
| JP | S621690 A | 1/1987 |

OTHER PUBLICATIONS

French Search Report for corresponding French Patent Application No. 2300838 dated Aug. 7, 2023.

*Primary Examiner* — Joshua E Rodden
(74) *Attorney, Agent, or Firm* — Greer, Burns & Crain, Ltd.

(57) ABSTRACT

An electrical propulsion assembly that includes: a propeller that has a rotation axis, at least two electric motors offset relative to one another in a longitudinal direction parallel to the rotation axis of the propeller, a main drive shaft parallel to the rotation axis of the propeller to which the electric motor are coupled, a transmission system including an output shaft connected to the propeller and an input shaft connected to the main drive shaft. Also an aircraft including at least one such electrical propulsion assembly.

11 Claims, 3 Drawing Sheets

(51) Int. Cl.
*B64D 35/08* (2006.01)
*F01D 15/02* (2006.01)
*F01D 15/12* (2006.01)

(52) U.S. Cl.
CPC .......... *F01D 15/12* (2013.01); *F05D 2260/40* (2013.01)

(58) Field of Classification Search
CPC .. B64D 35/021; B64D 35/022; B64D 35/023; B64D 35/024; B64D 35/025; B64D 35/026; B64D 35/04; B64D 35/06; B64D 35/08; F01D 13/00; F01D 13/003; F01D 13/006; F01D 13/02; F01D 15/02; F01D 15/12; F01D 2260/40

USPC .......................................................... 244/60
See application file for complete search history.

(56) References Cited

U.S. PATENT DOCUMENTS

| | | | |
|---|---|---|---|
| 2,531,032 A * | 11/1950 | Emile | B64D 35/04 |
| | | | 416/129 |
| 2,543,453 A * | 2/1951 | Fuller | B64D 35/04 |
| | | | 416/129 |
| 10,377,500 B2 * | 8/2019 | Kobayashi | B64D 27/351 |
| 11,565,803 B2 * | 1/2023 | Heironimus | B64D 27/24 |
| 11,613,375 B2 * | 3/2023 | Groninga | B64C 27/14 |
| | | | 416/170 R |
| 11,831,220 B2 * | 11/2023 | Beall | B64D 35/08 |
| 2005/0098143 A1 * | 5/2005 | Schwam | B64D 27/02 |
| | | | 123/242 |
| 2010/0187929 A1 * | 7/2010 | Hishida | H02K 16/00 |
| | | | 310/112 |
| 2016/0099628 A1 * | 4/2016 | Ried | H02K 11/23 |
| | | | 310/68 B |
| 2017/0190435 A1 * | 7/2017 | Kobayashi | B64D 31/16 |
| 2021/0276707 A1 | 9/2021 | Heironimus et al. | |
| 2021/0403174 A1 * | 12/2021 | Beall | H02K 16/00 |
| 2022/0120261 A1 | 4/2022 | Beall et al. | |
| 2023/0021085 A1 | 1/2023 | Allias et al. | |
| 2024/0159307 A1 * | 5/2024 | Beall | F16D 41/07 |

* cited by examiner

ELECTRICAL PROPULSION SYSTEM INCLUDING A PLURALITY OF ELECTRIC MOTORS COUPLED TO THE SAME INPUT SHAFT OF A TRANSMISSION SYSTEM, AIRCRAFT INCLUDING AT LEAST ONE SUCH ELECTRICAL PROPULSION ASSEMBLY

CROSS-REFERENCES TO RELATED APPLICATIONS

This application claims the benefit of French Patent Application Number 2300838 filed on Jan. 30, 2023, the entire disclosure of which is incorporated herein by way of reference.

FIELD OF THE INVENTION

The present application relates to an electrical propulsion system including a plurality of electric motors coupled to the same input shaft of a transmission system and an aircraft including at least one such electrical propulsion assembly.

BACKGROUND OF THE INVENTION

Figure 1:
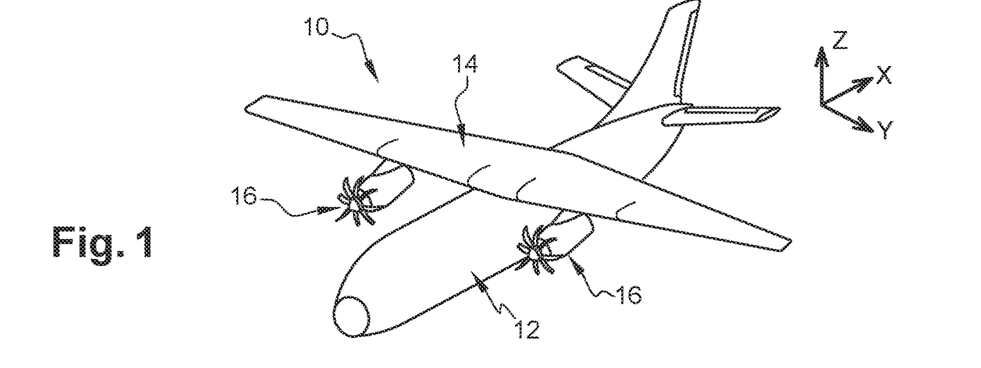
FIG. 1 is a perspective view of an aircraft.
Figure 2:
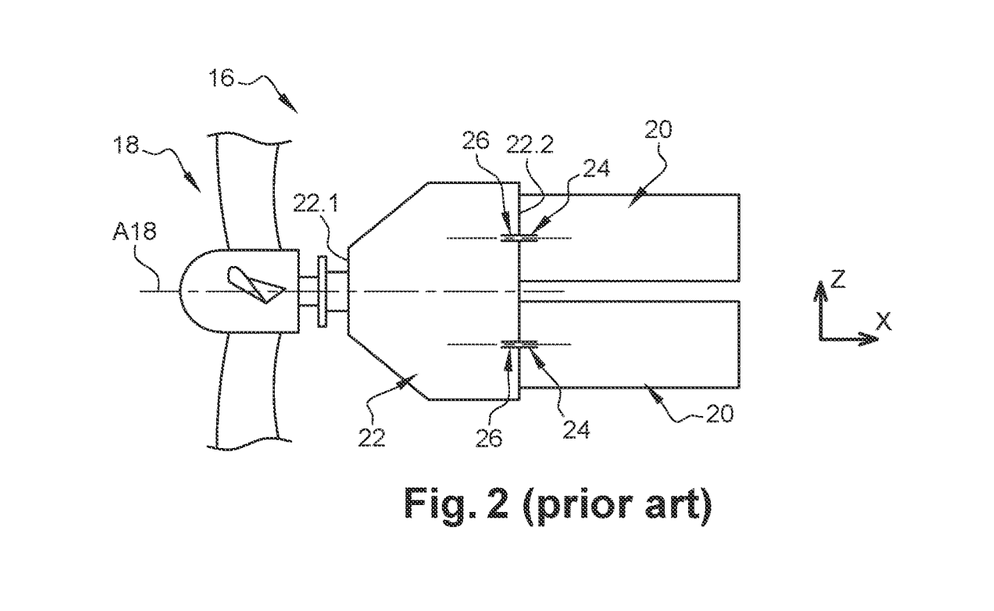
FIG. 2 is a schematic lateral view of an electrical propulsion assembly depicting a prior art embodiment.
Figure 3:
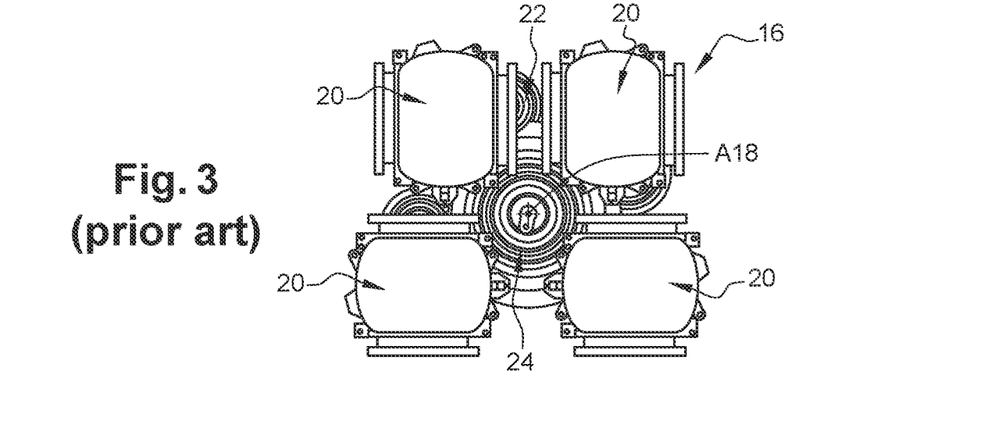
FIG. 3 is a schematic rear view of the electrical propulsion assembly seen in FIG. 2.

In accordance with one embodiment that can be seen in FIG. 1 an aircraft 10 comprises a fuselage 12, at least one set of wings 14 connected to the fuselage 12 and electrical propulsion assemblies 16 connected to the set of wings 14 and disposed on respective opposite side of the fuselage 12. As depicted in FIGS. 2 and 3 each electrical propulsion system 16 includes a propeller 18 that has a rotation axis A18.

For the remainder of the description a longitudinal direction X is parallel to the rotation axis A18 of the propeller 18. A longitudinal plane contains the rotation axis A18. A transverse plane is perpendicular to the longitudinal direction X. The "front" and "rear" concepts refer to the direction of flow of the air propelled by the electrical propulsion assembly, the air flowing from front to rear.

In according with one embodiment an electrical propulsion assembly comprises a plurality of electric motors 20 and a transmission system 22 such as a gearbox for example configured to couple the electric motors 20 to the propeller 18.

In an arrangement that can be seen in FIGS. 2 and 3 the transmission system 22 has a first transverse surface 22.1 oriented toward the propeller 18 and a second transverse surface 22.2 opposite the first transverse surface 22.1 to which the electric motors 20 are fixed.

Each electric motor 20 includes a drive shaft 24 parallel to the rotation axis A18 of the propeller 18. Each drive shaft 24 is connected to an input shaft 26 of the transmission system 22. The transmission system 22 therefore includes a plurality of input shafts 26 parallel to the rotation axis A18 of the propeller 18 and distributed around the latter.

This arrangement is not satisfactory because the transmission system 22 is relatively complex because of the number of input shafts 26. As depicted in FIG. 3 the electrical propulsion assembly 16 has a relatively large cross section at the level of the electric motors 20 because of their arrangement about the rotation axis A18 of the propeller 18.

SUMMARY OF THE INVENTION

The present invention aims to remedy some or all of the disadvantages of the prior art.

To this end the invention has for object an electrical propulsion assembly including:
a propeller that has a rotation axis; and
at least two electric motors;
a main drive shaft parallel to the rotation axis of the propeller; and
a transmission system configured to couple each electric motor to the propeller, including an output shaft connected to the propeller and an input shaft connected to the main drive shaft.

According to the invention the electric motors are coupled to the main drive shaft and offset relative to one another in a longitudinal direction parallel to the rotation axis of the propeller. Additionally, the electrical propulsion assembly includes for each electric motor a tubular secondary drive shaft connected to the electric motor, coaxial and concentric with the main drive shaft, and a coupling system coupling the secondary drive shaft and the main drive shaft, the electrical propulsion assembly including a rear secondary drive shaft and a rear coupling system farthest from the transmission system and a front secondary drive shaft and a front coupling system nearest the transmission system. Additionally, the secondary drive shafts, are coaxial and concentric, each secondary drive shaft having a substantially constant inside diameter, the secondary drive shafts having inside diameters that increase from the front secondary drive shaft to the rear secondary drive shaft. Additionally, each coupling system has an exterior surface connected to the corresponding secondary drive shaft by a permanent coupling and an inside surface connected to the main drive shaft by a permanent coupling, the coupling systems each having a substantially constant thickness, the thicknesses of the coupling systems increasing from the front coupling system to the rear coupling system.

The fact that all the electric motors are connected to the same main drive shaft means that only one transmission system input shaft is required, which contributes to making it less complex and more reliable. Furthermore, the electric motors being distributed in a longitudinal direction parallel to the rotation axis of the propeller and not around that axis, the electrical propulsion assembly has a smaller section in line with the electric motors.

In accordance with another feature each coupling system includes at least one disengageable or unidirectional coupling mechanism configured to occupy a first state in which the disengageable or unidirectional coupling mechanism couples the secondary drive shaft and the main drive shaft when the electric motor is driving the secondary drive shaft in rotation and a second state in which the disengageable or unidirectional coupling mechanism decouples the secondary drive shaft and the main drive shaft when the electric motor is not driving the secondary drive shaft in rotation.

In accordance with another feature each disengageable or unidirectional coupling mechanism is of freewheel type to go automatically and autonomously from the first state to the second state.

In accordance with another feature the electrical propulsion assembly includes a lubrication system configured to lubricate the disengageable or unidirectional coupling mechanisms.

In accordance with another feature at least one coupling system includes a disengageable or unidirectional coupling mechanism, a ring concentric with the disengageable or unidirectional coupling mechanism and a permanent coupling that couples the ring and the disengageable or unidirectional coupling mechanism.

In accordance with another feature the disengageable or unidirectional coupling mechanisms of the various coupling systems have substantially the same thickness and the same inside diameter substantially equal to the outside diameter of the main drive shaft.

In accordance with another feature the electrical propulsion assembly includes for each coupling system front and rear abutments positioned on respective opposite sides of the coupling system to immobilize the coupling system against movement in translation in the longitudinal direction.

In accordance with another feature for each coupling system concerned the front and rear abutments are secured to the secondary drive shaft coupled to the coupling system concerned, the front abutment nearest the transmission system corresponding to a shoulder on the secondary drive shaft, the rear abutment farthest from the transmission system being demountable.

In accordance with another feature the electric motors have identical rotors and additionally the electrical propulsion assembly includes for at least one given electric motor at least one radial connection connecting the rotor of the given electric motor and the secondary drive shaft to which the given electric motor is connected.

In accordance with another feature the electrical propulsion assembly includes at least one casing in which at least one electric motor is positioned and having front and rear transverse walls each including at least one orifice for accommodating at least one secondary drive shaft. Additionally, the electrical propulsion assembly includes for each rear or front transverse wall a bearing accommodated in the orifice and inserted between the rear or front transverse wall and the secondary drive shaft.

The invention also has for object an aircraft including at least one electrical propulsion assembly having any of the above features.

BRIEF DESCRIPTION OF THE DRAWINGS

Other features and advantages will emerge from the following description of the invention given by way of example only and with reference to the appended drawings in which.

DETAILED DESCRIPTION OF THE PREFERRED EMBODIMENTS

Figure 4:
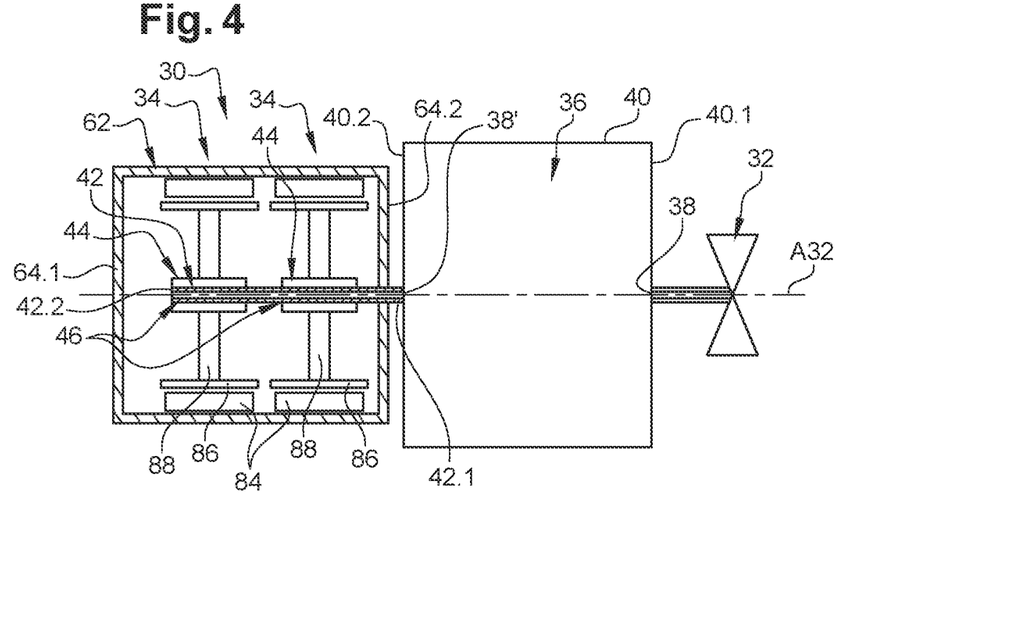
FIG. 4 is a schematic lateral view of an electrical propulsion assembly illustrative of a first embodiment of the invention.
Figure 5:
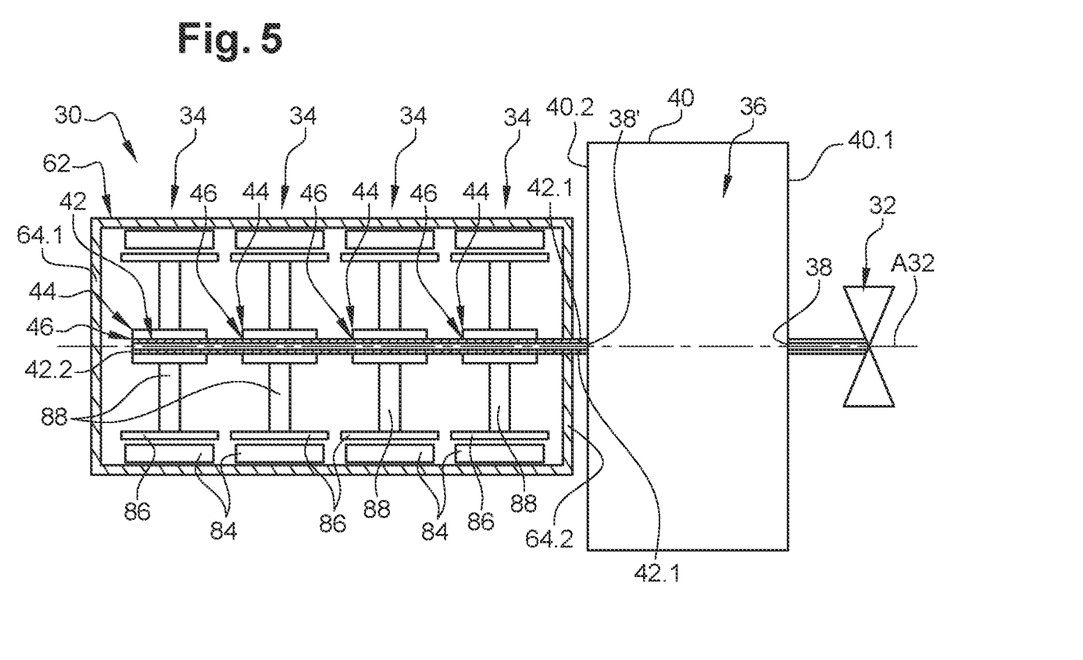
FIG. 5 is a schematic lateral view of an electrical propulsion assembly illustrative of a second embodiment of the invention.

In accordance with embodiments seen in FIGS. 4 and 5 an electrical propulsion assembly 30 includes a propeller 32 that has a rotation axis A32, at least two electric motors 34 and a transmission system 36 such as a gearbox for example configured to couple the electric motors 34 to the propeller 32. The rotation axis A32 of the propeller 32 is parallel to the longitudinal direction.

In one application an aircraft includes at least one such electrical propulsion assembly 30.

The fact of providing at least two electric motors enables a redundant architecture to be obtained strengthening flight safety.

The transmission system 36 is inserted between the propeller 32 and the electric motors 34. It includes an output shaft 38 connected to the propeller 32 and coaxial with the rotation axis A32 of the propeller 32 and an input shaft 38'. In a preferred arrangement the input shaft 38' is coaxial with the rotation axis A32 of the propeller 32. In one configuration the output and input shafts 38, 38' are tubular and configured to enable the passage of a control member of a system for adjusting the pitch of the propeller. Additionally, the transmission system 36 is configured to enable said control member to pass through it.

In accordance with one embodiment the transmission system 36 includes a transmission box 40 that includes a first transverse wall 40.1 oriented toward the propeller 32 and a second transverse wall 40.2 opposite the first transverse wall 40.1 and oriented toward the electric motors 34. Each of the first and second transverse walls 40.1, 40.2 includes at least one orifice to enable the output and input shafts 38, 38' to pass through it. In accordance with an embodiment seen in FIG. 4 the electrical propulsion assembly includes two electric motors 34. In accordance with other embodiments seen in FIGS. 5 and 6, the electrical propulsion assembly 30 includes four electric motors 34. Of course, the invention is not limited to these numbers of electric motors 34. Regardless of the embodiment, the electrical propulsion assembly 30 includes at least two electric motors 34, the latter being offset relative to one another in a longitudinal direction parallel to the rotation axis A32 of the propeller 32.

The electrical propulsion assembly 30 includes a main drive shaft 42 parallel to the rotation axis A32 of the propeller 32 that has a first end 42.1 connected to the input shaft 38' of the transmission system 36 and a second end 42.2 opposite the first end 42.1. The main drive shaft 42 and the input shaft 38' are aligned. The main drive shaft 42 is coaxial with the rotation axis A32 of the propeller 32. In accordance with one embodiment this main drive shaft 42 is tubular to accommodate the control member of a system for adjusting the pitch of the propeller.

The propulsion assembly includes for each electric motor 34 a secondary drive shaft 44 connected to the electric motor 34 that is coaxial and concentric with the main drive draft 42 and tubular so as to be able to accommodate said main drive shaft 42. Each secondary drive shaft 44 has an inside diameter and an outside diameter. Additionally, the electrical propulsion assembly 30 includes a coupling system 46 for each electric motor 34 coupling the secondary drive shaft 44 of the electric motor 34 and the main drive shaft 42.

In one configuration each coupling system 46 includes at least one disengageable or unidirectional coupling mechanism 48 such as a freewheel, for example. The disengageable or unidirectional coupling mechanism 48 is configured to occupy a first state in which the disengageable or unidirectional coupling mechanism 48 couples the secondary drive shaft 44 and the main drive shaft 42 when the electric motor 34 is driving the secondary drive shaft 44 in rotation, in particular when the electric motor 34 is functioning correctly, and a second state in which the disengageable or unidirectional coupling mechanism 48 uncouples the secondary drive shaft 44 and the main drive shaft 42 when the electric motor 34 is not driving the secondary drive shaft 44 in rotation, in particular in the case of a malfunction of the electric motor 34. The disengageable or unidirectional coupling mechanisms 48 enable reduction of the risk of damage to other electric motors in the event of a malfunction of one electric motor. In accordance with one embodiment each disengageable or unidirectional coupling mechanism 48 is of the freewheel type so as to go automatically and autonomously from the first state to the second state.

Figure 6:
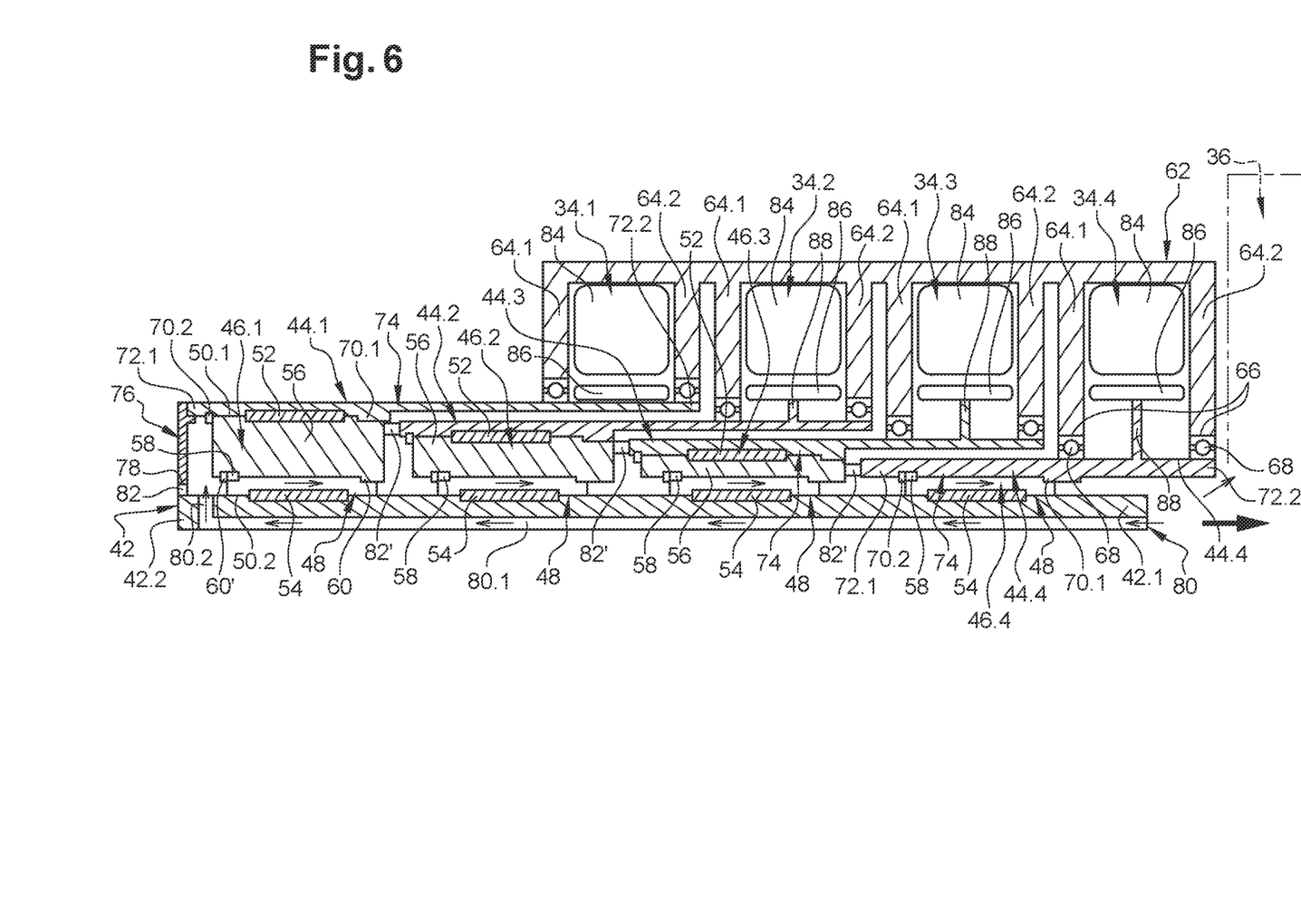
FIG. 6 is a longitudinal half-section of a part of an electrical propulsion assembly illustrative of one embodiment of the invention.

In accordance with an embodiment seen in FIG. 6 the electrical propulsion system 30 includes a plurality of electric motors 34.1 to 34.4 offset relative to one another in the longitudinal direction, including a rear electric motor 34.1 farthest from the transmission system 36 and a front electric motor 34.4 nearest the transmission system 36. The electrical propulsion assembly 30 includes a plurality of secondary drive shafts 44.1 to 44.4, one for each electric motor 34.1 to 34.4, including a rear secondary drive shaft 44.1 farthest from the transmission system 36 and a front secondary drive shaft 44.4 nearest the transmission system 36. The various secondary drive shafts 44.1 to 44.4 are coaxial and concentric.

The main drive shaft 42 includes a section for each coupling system 46 between its first and second ends 42.1, 42.2.

In accordance with an embodiment seen in FIG. 6 the main drive shaft 42 has a constant diameter throughout its length. The various sections of the main drive shaft 42 therefore all have the same diameter. Alternatively, each section has a constant diameter, the sections having diameters that decrease from the first end 42.1 to the second end 42.2.

In accordance with an embodiment seen in FIG. 6 each secondary drive shaft 44.1 to 44.4 has a substantially constant inside diameter and a substantially constant outside diameter, the secondary drive shafts 44.1 to 44.4 having inside and outside diameters that increase from the front secondary drive shaft 44.4 to the rear secondary drive shaft 44.1. This configuration enables demounting of the main drive shaft 42 by pulling it toward the rear and away from the transmission system 36. In accordance with another variant the secondary drive shafts 44.1 to 44.4 have inside and outside diameters that decrease from the front secondary drive shaft 44.4 to the rear secondary drive shaft 44.1. Of course, the invention is not limited to these variants. The secondary drive shafts 44.1 to 44.4 therefore need not be concentric and have the same inside diameter and the same outside diameter.

The electrical propulsion system 30 includes a coupling system 46.1 to 46.4 for each electric motor 34.1 to 34.4 including a rear coupling system 46.1 farthest from the transmission system 36 that connects the rear secondary drive shaft 44.1 and the main drive shaft 42 and a front coupling system 46.4 nearest the transmission system 36 that connects the front secondary drive shaft 44.4 and the main drive shaft 42. Each coupling system 46.1 to 46.4 has an exterior surface 50.1 connected to the corresponding secondary drive shaft 44.1 to 44.4 by a permanent coupling 52, such as a keyed coupling for example, and an interior surface 50.2 connected to the main drive shaft 42 by a permanent coupling 54 such as a keyed coupling for example.

In accordance with an embodiment seen in FIG. 6 the various coupling systems 46.1 to 46.4 each have a substantially constant thickness (the distance separating the exterior and interior surfaces 50.1, 50.2), the thicknesses of the coupling systems increasing from the front coupling system 46.4 to the rear coupling system 46.1. Alternatively, the thicknesses of the various coupling systems 46.1 to 46.4 could decrease from the front coupling system 46.4 to the rear coupling system 46.1. In accordance with another variant the coupling systems 46.1 to 46.4 could have the same thickness.

In one configuration at least one coupling system 46.1 to 46.4 includes a disengageable or unidirectional coupling mechanism 48 such as a freewheel for example, a ring 56 concentric with the disengageable or unidirectional coupling mechanism 48, and a permanent coupling 58 such as a keyed coupling for example coupling the ring 56 and the disengageable or unidirectional coupling mechanism 48. The disengageable or unidirectional coupling mechanism 48 and the ring 56 are coaxial and concentric, one of them being positioned inside the other one. In accordance with one embodiment each coupling system 46.1 to 46.4 includes at least one abutment 60 for immobilizing against movement in translation in the longitudinal direction the ring 56 and the disengageable or unidirectional coupling mechanism 48 relative to one another. For example, each coupling system 46.1 to 46.4 includes a first abutment 60 in the form of a shoulder on the ring 56 and a second abutment 60' in the form of a circlip housed in a groove in the ring 56, the disengageable or unidirectional coupling mechanism 48 being positioned between the first and second abutments 60, 60'.

In one arrangement the ring 56 is positioned around the disengageable or unidirectional coupling mechanism 48. In this arrangement the disengageable or unidirectional coupling mechanism 48 has an interior surface that corresponds to the interior surface 50.2 of the coupling system 46.1 to 46.4 and an inside diameter substantially equal to the diameter of the section concerned of the main drive shaft 42. Additionally, the ring 56 has an exterior surface that corresponds to the exterior surface 50.1 of the coupling system 46.1 to 46.4 and an outside diameter substantially equal to the inside diameter of the corresponding secondary drive shaft 44.1 to 44.4. The disengageable or unidirectional coupling mechanism 48 has an exterior surface that has a diameter substantially equal to that of the interior surface of the ring 56.

In accordance with one embodiment each coupling system 46.1 to 46.4 includes a disengageable or unidirectional coupling mechanism 48. The disengageable or unidirectional coupling mechanisms 48 of the various coupling systems 46.1 to 46.4 have substantially the same thickness and the same inside diameter substantially equal to the outside diameter of the main drive shaft 42. The electrical propulsion assembly 30 includes for each disengageable or unidirectional coupling mechanism 48 a permanent coupling 54, such as a keyed coupling for example, coupling the disengageable or unidirectional coupling mechanism 48 concerned and the main drive shaft 42.

With the exception of the front coupling system 46.4 having the smallest thickness and not including a ring 56, the other coupling systems 46.1 to 46.3 each include a ring 56 that has a substantially constant thickness, the thicknesses of the rings 56 increasing in the direction away from the transmission system 36. Each ring 56 has a substantially constant inside diameter and a substantially constant outside diameter. The rings 56 have equal inside diameters and outside diameters that increase in the direction away from the transmission system 36.

The electrical propulsion assembly 30 includes at least one motor casing 62 in which at least one electric motor 34 is positioned. In accordance with embodiments seen in FIGS. 4 and 5 the electrical propulsion assembly 30 includes a single motor casing 62 in which all the electric motors 34.1 to 34.4 are positioned.

In accordance with another embodiment seen in FIG. 6 the electrical propulsion assembly 30 includes for each electric motor 34.1 to 34.4 a motor casing 62 that has a rear transverse wall 64.1 and a front transverse wall 64.2 nearer the transmission system 36 than the rear transverse wall 64.1. Each front or rear transverse wall 64.1, 64.2 of a given electric motor 34.1 to 34.4 includes at least one orifice 66 to accommodate at least the secondary drive shaft 44.1 to 44.4 connected to the given electric motor 34.1 to 34.4. The electrical propulsion assembly 30 includes for each rear or front transverse wall 64.1, 64.2 of a given electric motor 34.1 to 34.4 a bearing 68 accommodated in the orifice 66 and inserted between the rear or front transverse wall 64.1, 64.2 and the secondary drive shaft 44.1 to 44.4 connected to the given electric motor 34.1 to 34.4. This bearing 68 favors the rotation of the secondary drive shaft 44.1 to 44.4 relative to the rear or front transverse wall 64.1, 64.2.

In accordance with an embodiment seen in FIG. 6 the electrical propulsion assembly 30 includes for each coupling system 46.1 to 46.4 front and rear abutments 70.1, 70.2 positioned on respective opposite sides of the coupling system 46.1 to 46.4 enabling immobilization against movement in translation in the longitudinal direction of the coupling system 46.1 to 46.4. In one arrangement the front and rear abutments 70.1, 70.2 of each coupling system 46.1 to 46.2 concerned are secured to the secondary drive shaft 44.1 to 44.4 coupled to the coupling system 46.1 to 46.2 concerned. In one configuration the front abutment 70.1 nearest the transmission system 36 corresponds to a shoulder on the secondary drive shaft 44.1 to 44.4. The rear abutment 70.2 farthest from the transmission system 36 is demountable and includes a circlip inserted in a groove in the secondary drive shaft 44.1 to 44.4.

As depicted in FIG. 6 each secondary drive shaft 44.1 to 44.4 has a rear end 72.1 farthest from the transmission system 36 and a front end 72.2 nearest the transmission system 36. In one configuration the front end 72.2 of each secondary drive shaft 44.1 to 44.4 does not extend beyond the front transverse wall 64.2 positioned at the front of the electric motor 34.1 to 34.4 to which the secondary drive shaft 44.1 to 44.4 is coupled. The rear end 72.1 of each secondary drive shaft 44.1 to 44.4 is offset toward the rear relative to the rear transverse wall 64.1 positioned to the rear of the electric motor 34.1 to 34.4 to which the secondary drive shaft 44.1 to 44.4 is coupled. Each secondary drive shaft 44.1 to 44.4 therefore includes an extension 74 projecting toward the rear relative to the rear transverse wall 64.1 positioned at the rear of the electric motor 34.1 to 34.4 to which the secondary drive shaft 44.1 to 44.4 is connected.

In one configuration the electrical propulsion assembly 30 includes a plug 76 for blocking the rear end 72.1 of the rear secondary drive shaft 44.1. This plug 76 is demountably connected to the rear secondary drive shaft 44.1. In one arrangement this plug 76 includes an orifice 78 enabling the rear secondary drive shaft 44.1 to pass through it.

In accordance with an embodiment seen in FIG. 6 the electrical propulsion assembly 30 includes a lubrication system 80 configured to lubricate the various disengageable or unidirectional coupling mechanisms 48 and/or the bearings 68. Additionally, the electrical propulsion assembly 30 includes seals 82 positioned to delimit a zone in which the disengageable or unidirectional coupling mechanisms 48 are positioned. The lubrication system 80 provided for the various disengageable or unidirectional coupling mechanisms 48 includes a duct 80.1 in the main drive shaft 42 discharging to the outside of the main drive shaft 42 via at least one orifice 80.2. The electrical propulsion assembly 30 includes an end seal 82 inserted between the plug 76 and the main drive shaft 42 and intercalary seals 82' positioned between the rings 56 of the coupling systems 46.1 to 46.3 and the rear ends 72.1 of the secondary drive shafts 44.2 to 44.4. These seals 82, 82' are rotary seals. In a nominal operating mode, the secondary guide shafts 44.1 to 44.4 turning at the same speed, the seals 82' do not turn. In the event of a fault, at least one of the secondary drive shafts 44.1 to 44.4 not turning at the same speed as the others, at least one of these seals 82' turns.

Other solutions can be envisaged for the lubrication of the disengageable or unidirectional coupling mechanisms 48.

The embodiment seen in FIG. 6 results in increased maintainability, the coupling systems 46.1 to 46.4 being demountable without it being necessary to demount the electric motors 34.1 to 34.4. In one operating mode, to demount the coupling systems 46.1 to 46.4 the plug 76 and the end seal 82 are removed, after which the rear abutment 70.2 in the form of a circlip of the rear coupling system 46.1 is removed. The disengageable or unidirectional coupling mechanisms 48 and the ring 56 of the rear coupling system 46.1 are then removed from the rear secondary drive shaft 44.1. For each of the following coupling systems 46.2 to 46.4 coupled to a given secondary drive shaft 44.1 to 44.4 the intercalary seal 82' provided at the rear end 72.1 of the given secondary drive shaft 44.1 to 44.4 is removed, the rear abutment 70.2 in the form of a circlip is removed, and then the disengageable or unidirectional coupling mechanism 48 and where appropriate the ring 56 are removed from the given secondary motor shaft 44.1 to 44.4.

In one embodiment each electric motor 34, 34.1 to 34.4 includes a fixed stator 84 connected to the motor casing 62 and coaxial with the rotation axis A32 of the propeller 32 and a rotor 86 positioned inside the stator 84 and coaxial with the rotation axis A32 of the propeller 32, the rotor 86 being hollow so as to have the corresponding secondary drive shaft 44.1 to 44.4 pass through it and connected to the latter. In one configuration the stator 84 is wound and the rotor 86 includes permanent magnets. Of course, the invention is not limited to this configuration for the electric motors.

If an electric motor 34.1 to 34.4 malfunctions the unidirectional coupling mechanism 48 of the coupling system 46.1 to 46.4 coupled to that faulty electric motor 34.1 to 34.4 enables automatic and autonomous uncoupling of its secondary drive shaft 44.1 to 44.4 from the main drive shaft 42, which makes it possible to reduce wear of the bearings 68 and the risk of damaging the other electric motors 34.1 to 34.4.

In one embodiment the various electric motors have identical rotors 86 having the same outside diameter and the same inside diameter. The electric motors are identical and have the same airgap.

For at least one given electric motor 34.1 to 34.4 the electrical propulsion assembly 30 includes at least one radial connection 88 connecting the rotor 86 of the given electric motor 34.1 to 34.4 and the secondary drive shaft 44.1 to 44.4 to which the electric motor 34.1 to 34.4 is connected. This solution makes it possible to have the greatest possible airgap diameter, to have concentric secondary drive shafts 44.1 to 44.4, and to limit the mass of the rotating elements.

In accordance with an embodiment seen in FIG. 6 the rotors 86 of the various electric motors 34.1 to 34.4 are all identical, the rotor 86 of the rear electric motor 34.1 having an inside diameter substantially equal to the outer diameter of the rear secondary drive shaft 44.1. The rotors 86 of the other electric motors 34.2 to 34.4 are connected by radial connections to the secondary drive shafts 44.2 to 44.4. In one configuration, in each electrical propulsion assembly 30 each electric motor 34.1 to 34.4 is configured in terms of power to enable flight even in the event of loss of an electric motor or other electric motors.

Each electric motor 34.1 to 34.4 is configured to drive the secondary drive shaft 44.1 to 44.4 at a high rotation speed, greater than or equal to 10,000 rpm.

The electrical propulsion assembly 30 has the following main advantages:

It includes a transmission system 36 less complex and more reliable than those of the prior art because it has only one input shaft 38'.

It has a smaller section at the level of the electric motors because the latter are aligned in a direction parallel to the rotation axis A32 of the propeller 32 and not distributed around that rotation axis A32.

It is very compact because the secondary drive shafts 44.1 to 44.4 are arranged in a concentric manner.

It has a high power density because of the use of electric motors 34.1 to 34.4 rotating at high speeds and/or having large airgap diameters.

It is very safe because of the presence of the disengageable or unidirectional coupling mechanisms 48 each of which enables a faulty electric motor 34.1 to 34.4 to be uncoupled from the main drive shaft 42.

It has improved maintainability given its architecture.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical propulsion assembly including:
a propeller having a rotation axis;
at least two electric motors;
a main drive shaft parallel to the rotation axis of the propeller;
a transmission system configured to couple each electric motor to the propeller and including an output shaft connected to the propeller and an input shaft connected to the main drive shaft;
wherein the at least two electric motors are coupled to the main drive shaft and offset relative to one another in a longitudinal direction parallel to the rotation axis of the propeller;
wherein the electrical propulsion assembly includes, for each electric motor, a secondary drive shaft, and a coupling system coupling the secondary drive shaft and the main drive shaft, the secondary drive shaft being tubular and connected to the electric motor, coaxial and concentric with the main drive shaft;
wherein a rear secondary drive shaft of the secondary drive shafts and a rear coupling system of the coupling systems is farthest from the transmission system, and a front secondary drive shaft of the secondary drive shafts and a front coupling system of the coupling systems is nearest the transmission system;
wherein the secondary drive shafts are coaxial and concentric;
wherein each secondary drive shaft has a constant inside diameter, and the secondary drive shafts are arranged such that the inside diameters increase from the front secondary drive shaft to the rear secondary drive shaft; and
wherein each coupling system has an exterior surface connected to the corresponding secondary drive shaft by a permanent coupling and an inside surface connected to the main drive shaft by a permanent coupling, the coupling systems each having a substantially constant thickness, the coupling systems arranged so that the thicknesses of the coupling systems increase from the front coupling system to the rear coupling system.

2. The electrical propulsion assembly according to claim 1, wherein each coupling system includes at least one disengageable or unidirectional coupling mechanism configured to occupy a first state in which the disengageable or unidirectional coupling mechanism couples the secondary drive shaft and the main drive shaft when the electric motor is driving the secondary drive shaft in rotation and a second state in which the disengageable or unidirectional coupling mechanism decouples the secondary drive shaft and the main drive shaft when the electric motor is not driving the secondary drive shaft in rotation.

3. The electrical propulsion assembly according to claim 2, wherein each disengageable or unidirectional coupling mechanism is a freewheel which, automatically and autonomously, goes from the first state to the second state.

4. The electrical propulsion assembly according to claim 2, wherein the electrical propulsion assembly includes a lubrication system configured to lubricate the disengageable or unidirectional coupling mechanisms.

5. The electrical propulsion assembly according to claim 1, wherein at least one coupling system includes a disengageable or unidirectional coupling mechanism, a ring concentric with the disengageable or unidirectional coupling mechanism, and a permanent coupling configured to couple the ring and the disengageable or unidirectional coupling mechanism.

6. The electrical propulsion assembly according to claim 5, wherein at least two coupling systems include a disengageable or unidirectional coupling mechanism,
wherein the disengageable or unidirectional coupling mechanisms have substantially the same thickness and the same inside diameter substantially equal to an outside diameter of the main drive shaft.

7. The electrical propulsion assembly according to claim 1, wherein the electrical propulsion assembly includes, for each coupling system, a front abutment and a rear abutment positioned on respective opposite sides of the coupling system to immobilize the coupling system against movement in translation in the longitudinal direction.

8. The electrical propulsion assembly according to claim 7, wherein, for each coupling system, the front and rear abutments are secured to the secondary drive shaft coupled to the respective coupling system, the front abutment nearest the transmission system corresponding to a shoulder on the secondary drive shaft, the rear abutment farthest from the transmission system being demountable.

9. The electrical propulsion assembly according to claim 1, wherein the at least two electric motors have identical rotors; and wherein the electrical propulsion assembly further comprises, for at least one electric motor, at least one radial connection connecting the rotor of the at least one electric motor and the secondary drive shaft to which the at least one electric motor is connected.

10. The electrical propulsion assembly according to claim 1, further comprising:

at least one casing in which at least one electric motor is positioned and having front and rear transverse walls each including at least one orifice for accommodating at least one secondary drive shaft; and for each rear or front transverse wall, a bearing accommodated in the orifice and inserted between the respective transverse wall and the secondary drive shaft.

11. An aircraft comprising:
the electrical propulsion assembly according to claim 1.

* * * * *